(12) United States Patent
Cole

(10) Patent No.: US 9,962,785 B2
(45) Date of Patent: May 8, 2018

(54) SYSTEM AND METHOD FOR TRUE ELECTRODE SPEED

(71) Applicant: LINCOLN GLOBAL, INC., City of Industry, CA (US)

(72) Inventor: Stephen R. Cole, Chula Vista, CA (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 260 days.

(21) Appl. No.: 14/516,816

(22) Filed: Oct. 17, 2014

(65) Prior Publication Data

US 2015/0165540 A1 Jun. 18, 2015

Related U.S. Application Data

(60) Provisional application No. 61/915,293, filed on Dec. 12, 2013.

(51) Int. Cl.
*B23K 9/12* (2006.01)
*B23K 9/04* (2006.01)
(Continued)

(52) U.S. Cl.
CPC ............ *B23K 9/048* (2013.01); *B23K 9/0008* (2013.01); *B23K 9/0213* (2013.01);
(Continued)

(58) Field of Classification Search
CPC .......... B23K 9/11; B23K 9/09; B23K 9/0956; B23K 9/09565
(Continued)

(56) References Cited

U.S. PATENT DOCUMENTS

| 1,212,869 A | 1/1917 | Woodrow |
| 1,278,985 A * | 9/1918 | Morton ................ B23K 9/0209 |
| | | 219/126 |

(Continued)

FOREIGN PATENT DOCUMENTS

| EP | 2027962 | 8/2008 |
| EP | 2292363 | 9/2009 |

(Continued)

OTHER PUBLICATIONS

International Preliminary Report on Patentability for PCT/IB2014/002686, dated Jun. 23, 2016.

(Continued)

*Primary Examiner* — Dana Ross
*Assistant Examiner* — Ayub Maye
(74) *Attorney, Agent, or Firm* — Foley & Lardner LLP

(57) ABSTRACT

The invention described herein generally pertains to a system and method related to detecting a change in height during a welding operation and adjusting one or more welding parameters based on such detected change in height. In particular, a change in a height can be related to two or more revolutions on the workpiece in which the change is due to material being deposited onto the workpiece from the welding operation. Since the material deposited onto the workpiece changes the height of the electrode to the workpiece, one or more welding parameters can be adjusted for compensation. Specifically, an electrode speed can be adjusted to compensate for a change in the height, wherein the electrode speed is a rate that the electrode moves adjacent to the workpiece.

12 Claims, 8 Drawing Sheets

(51) Int. Cl.
  *B23K 9/00* (2006.01)
  *B23K 9/095* (2006.01)
  *B23K 9/02* (2006.01)
  *B23K 9/028* (2006.01)
  *B23K 9/073* (2006.01)
  *B23K 37/02* (2006.01)
  *B23K 101/06* (2006.01)

(52) U.S. Cl.
  CPC .......... *B23K 9/0286* (2013.01); *B23K 9/0735* (2013.01); *B23K 9/0956* (2013.01); *B23K 9/122* (2013.01); *B23K 37/0217* (2013.01); *B23K 2201/06* (2013.01)

(58) Field of Classification Search
  USPC ....... 219/76.1, 76.22, 124.1, 124.32, 124.33, 219/76.14, 76.15
  See application file for complete search history.

(56) References Cited

U.S. PATENT DOCUMENTS

| | | | | |
|---|---|---|---|---|
| 3,795,785 | A | | 3/1974 | Smith |
| 3,838,244 | A | * | 9/1974 | Petrides ............... B23K 9/0286 219/124.02 |
| 4,296,306 | A | * | 10/1981 | Nomura ................ B23K 9/028 219/124.32 |
| 4,920,249 | A | * | 4/1990 | McLaughlin ........ B23K 9/0956 219/124.34 |
| 5,107,093 | A | * | 4/1992 | Ekelof ................. B23K 9/1278 219/124.34 |
| 5,166,495 | A | * | 11/1992 | Ekelof ................... B23K 9/127 219/124.34 |
| 6,429,404 | B1 | * | 8/2002 | Suzuki ................. B23K 9/0216 219/124.34 |
| 6,627,839 | B1 | * | 9/2003 | Luckowski .......... B23K 9/1735 219/137 PS |
| 2002/0158048 | A1 | * | 10/2002 | Stricklen .............. B23K 9/1336 219/75 |
| 2004/0195212 | A1 | * | 10/2004 | Borne ................... B23K 9/291 219/75 |
| 2008/0210677 | A1 | | 9/2008 | Nakamura |
| 2009/0289044 | A1 | | 11/2009 | Fujiwara |
| 2012/0325791 | A1 | | 12/2012 | Ash |
| 2013/0299475 | A1 | * | 11/2013 | Aoki ................... B23K 9/0953 219/124.03 |

FOREIGN PATENT DOCUMENTS

| | | |
|---|---|---|
| JP | 7148576 | 6/1995 |
| JP | 08066771 | 3/1996 |
| JP | 10193110 | 7/1998 |
| JP | 11179541 | 6/1999 |
| JP | 11179541 A | 7/1999 |

OTHER PUBLICATIONS

PCT/IB2014/002686—International Search Report and Written Opinion of the International Searching Authority dated Apr. 22, 2015.

* cited by examiner

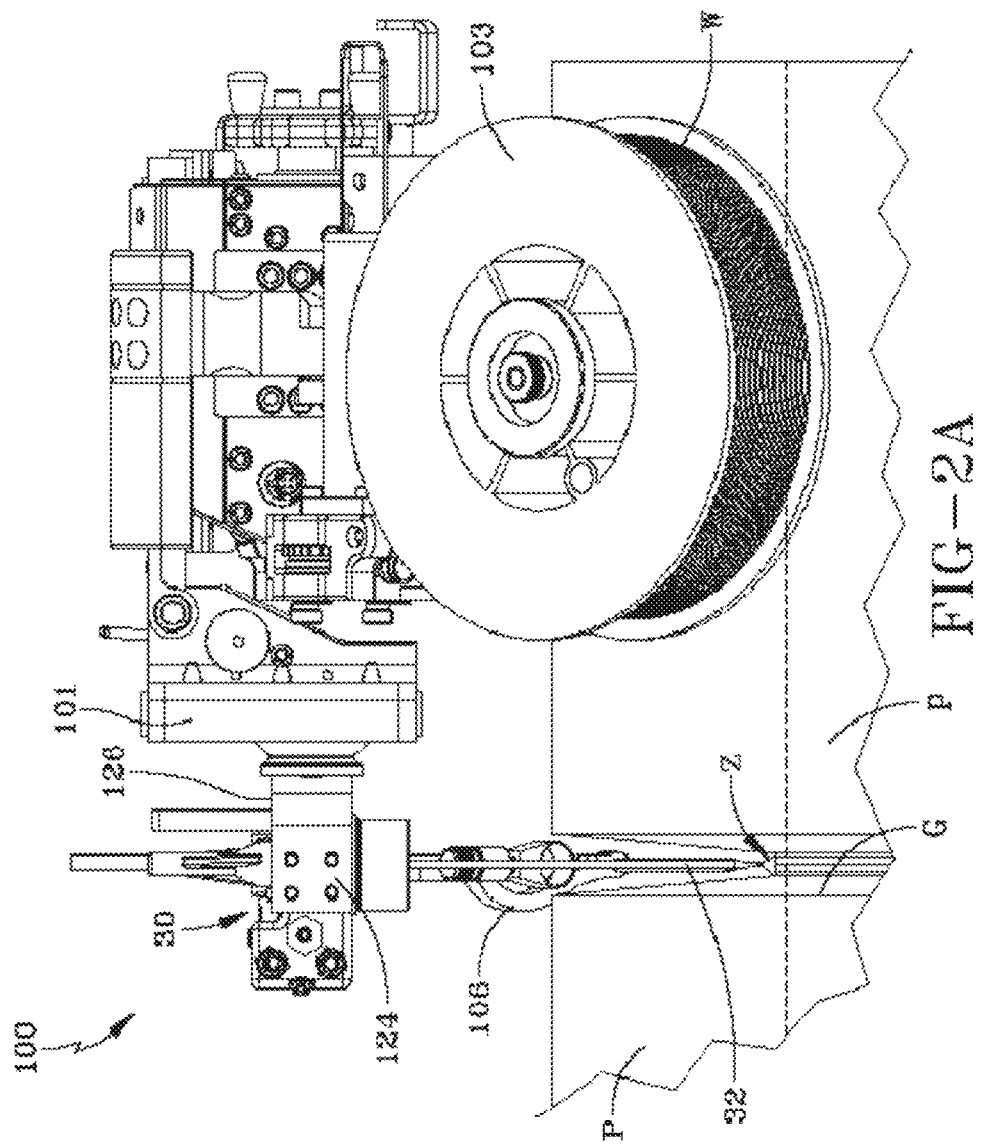

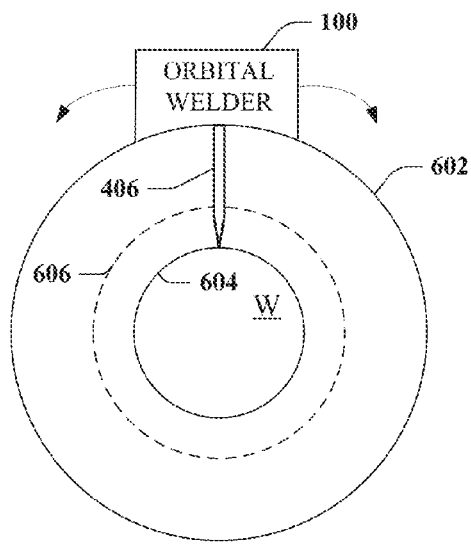
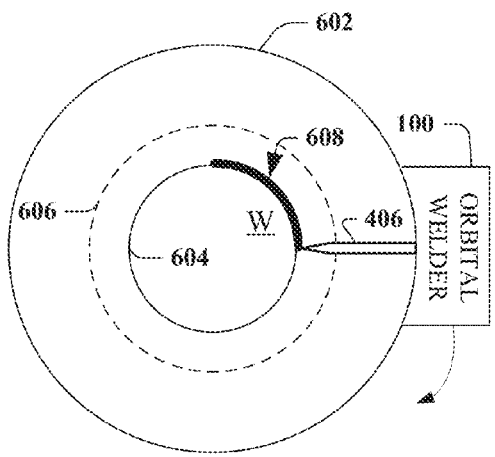
FIG. 6  FIG. 7
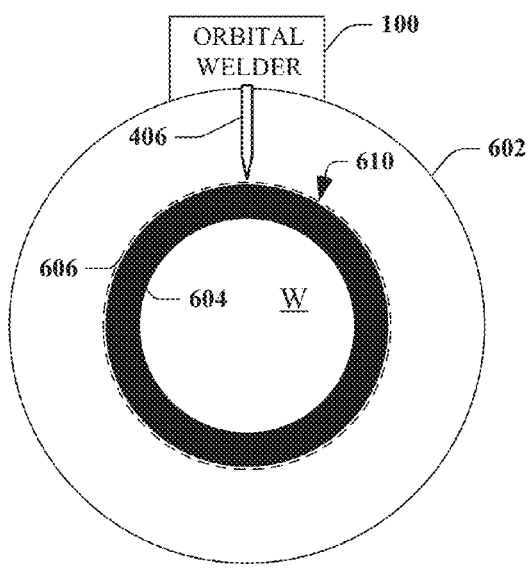
FIG. 8

SYSTEM AND METHOD FOR TRUE ELECTRODE SPEED

PRIORITY

This application claims the benefit of priority to U.S. Provisional Application Ser. No. 61/915,293, filed Dec. 12, 2013, and entitled "SYSTEM AND METHOD FOR TRUE ELECTRODE SPEED." The entirety of the aforementioned application is incorporated herein by reference.

TECHNICAL FIELD

In general, the present invention relates to an orbital welding system that detects an electrode speed in relation to a change in height due to material deposited from a welding operation. More particularly, the present invention relates to controlling a welding parameter based on a change in height of an electrode to a workpiece.

BACKGROUND OF THE INVENTION

Welding systems reside at the core of the modern industrial age. From massive automobile assembly operations to automated manufacturing environments, these systems facilitate joining in ever more complicated manufacturing operations. Hot wire welding processes a wire or electrode being heated (e.g., via current) and received by a puddle created by a main heat source (e.g., plasma arc, tungsten inert gas (TIG) welding, metal inert gas (MIG) welding, flux core, among others). The hot wire welding process includes the resistance heating of the up to or near a melting point of such wire. In hot wire welding processes, the formation of an arc is avoided since an arc condition disrupts or overheats the puddle. A wire heated near or close to the melting point of the wire without arcing events is received by the puddle with little or no disruption. In order to prevent a formation of an arc, a welding parameter related to the workpiece can be detected. The welding parameter can indicate an arc condition in which the hot wire welding process can be adjusted.

Additionally, welding may involve, raising, cladding, building up, filling, hard facing, overlaying, joining, and other welding applications. When confronted with a workpiece having a curved surface, an orbital welding process may be used to rotate the welding head to apply a weld to the curved surface. The most common examples, where orbital welding is used, is the welding of pipe. Pipe welding may include thin wall application where the welding head is rotated about the other surface two piece ends being joined together, alternatively, pipe welding may include deep groove geometries where the welding electrode extends into a grove formed between the two pipes being joined to lay down successive beads of weld material to fill the groove and join the thick walled pipes. Orbital welding systems may include a welding head that is mounted on a guide track or a fixture that clamps or is otherwise supported on the workpiece and rotated to supply a weld. In another embodiment, an orbital welding system can include a chassis with a wheel system that includes one or more magnets to travel adjacent a workpiece. In other words, an orbital welding system that does not utilize a track or guide is considered within the scope of the subject innovation. Orbital welding often involves limited visibility of a welding zone with lead cameras and/or trailing cameras.

Welding systems can include numerous controls that can be adjusted by a user during a welding operation. For instance, conventional welding systems can include up to sixteen (16) buttons, inputs, and switches that require years of experience to comprehend and use efficiently. Often, a change in one adjustment can lead to a change in another adjustment in order to maintain consistency.

Orbital welding systems and non-orbital welding systems can be compromised by the number of adjustments a user can implement and what is needed is an improved technique to relate to preventing adjustment that is detrimental to a welding operation.

SUMMARY OF THE INVENTION

In accordance with an embodiment of the present invention, a system that controls a welding parameter for a welding operation is provided. The welding system can include a welding torch detachably coupled to a track affixed adjacently to a pipe, wherein the welding torch includes an electrode to perform a welding operation to deposit a layer of material onto the pipe and the welding operation is on an inner diameter of the pipe or an outer diameter of the pipe. The system can include a power source that creates an arc between the electrode and the workpiece and a depth component that detects a height from the electrode to the workpiece. The system can include a position component that actuates the welding torch at a first electrode speed on the track and a controller component that employs a second electrode speed for the welding torch based upon a change in the height.

In accordance with an embodiment of the present invention, a method is provided that includes at least the steps of the following: detecting a height of an electrode from a curved workpiece; performing a welding operation by creating an arc between the electrode and the curved workpiece; identifying the weld operation as an inner diameter welding operation or an outer diameter welding operation; utilizing an electrode speed for the welding operation; detecting a change of height of the electrode during the welding operation; and adjusting the electrode speed based on the change of height, a curvature measurement of the curved workpiece, and a track parameter of an orbital welder that performs the welding operation.

In accordance with an embodiment of the present invention, a welder system is provided that includes at least the following: an orbital welder having a chassis supported adjacent to a workpiece; a welding torch coupled to the chassis that includes an electrode; a power source that creates an arc between the electrode and the workpiece; a wire feeder that is connected to a supply of welding wire to provide a welding wire to a puddle formed by the electrode; means for receiving a user input for an inner diameter welding operation or an outer diameter welding operation; means for moving the welding torch on a track coupled to the chassis at an electrode speed; means for detecting a change of a height of the electrode from the workpiece during the welding operation; means for adjusting the electrode speed based on the step of detecting the change of the height and the user input; and means for displaying the electrode speed during the welding operation.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 2A illustrates a side view of an orbital welding system;

FIG. 6 is a cross-sectional view illustrating a welder operation that deposits material onto a pipe;

FIG. 7 is a cross-sectional view illustrating a welder operation that deposits material onto a pipe;

FIG. 8 is a cross-sectional view illustrating a welder operation that deposits material onto a pipe.

DETAILED DESCRIPTION OF THE INVENTION

Embodiments of the invention relate to methods and systems that relate to detecting a change in height during a welding operation and adjusting one or more welding parameters based on such detected change in height. In particular, a change in a height can be related to two or more revolutions on the workpiece in which the change is due to material deposited from the welding operation. Since the material deposited onto the workpiece changes the height of the electrode to the workpiece, one or more welding parameters can be adjusted for compensation. Specifically, an electrode speed can be adjusted to compensate for a change in the height, wherein the electrode speed is a rate that the electrode moves adjacent to the workpiece.

"Welding" or "weld" as used herein including any other formatives of these words will refer to depositing of molten material through the operation of an electric arc including but not limited to submerged arc, GTAW, GMAW, MAG, MIG, TIG welding, or any electric arc used with a welding system.

Figure 1:
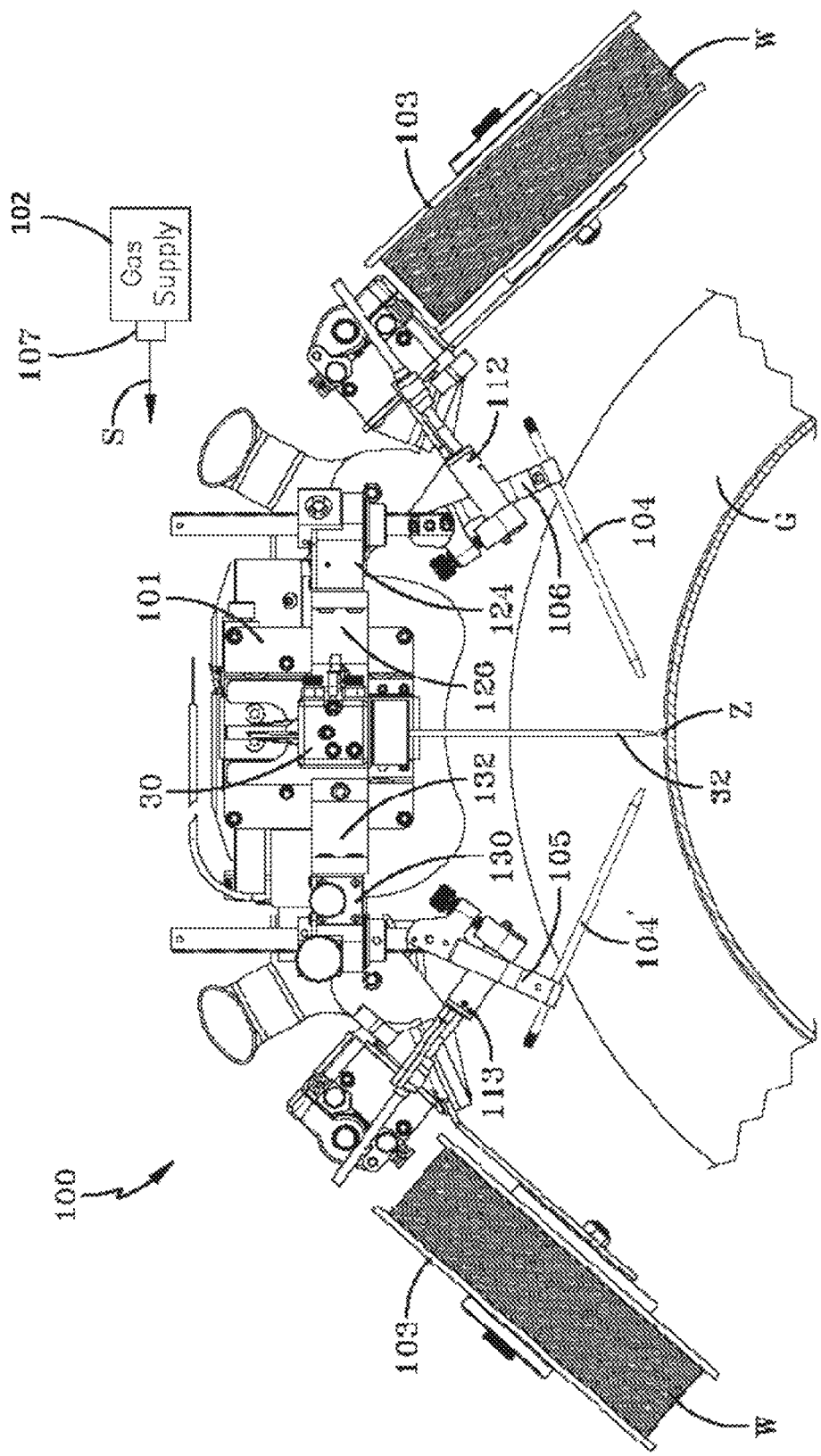
FIG. 1 illustrates a front view of an orbital welding system.
Figure 2B:
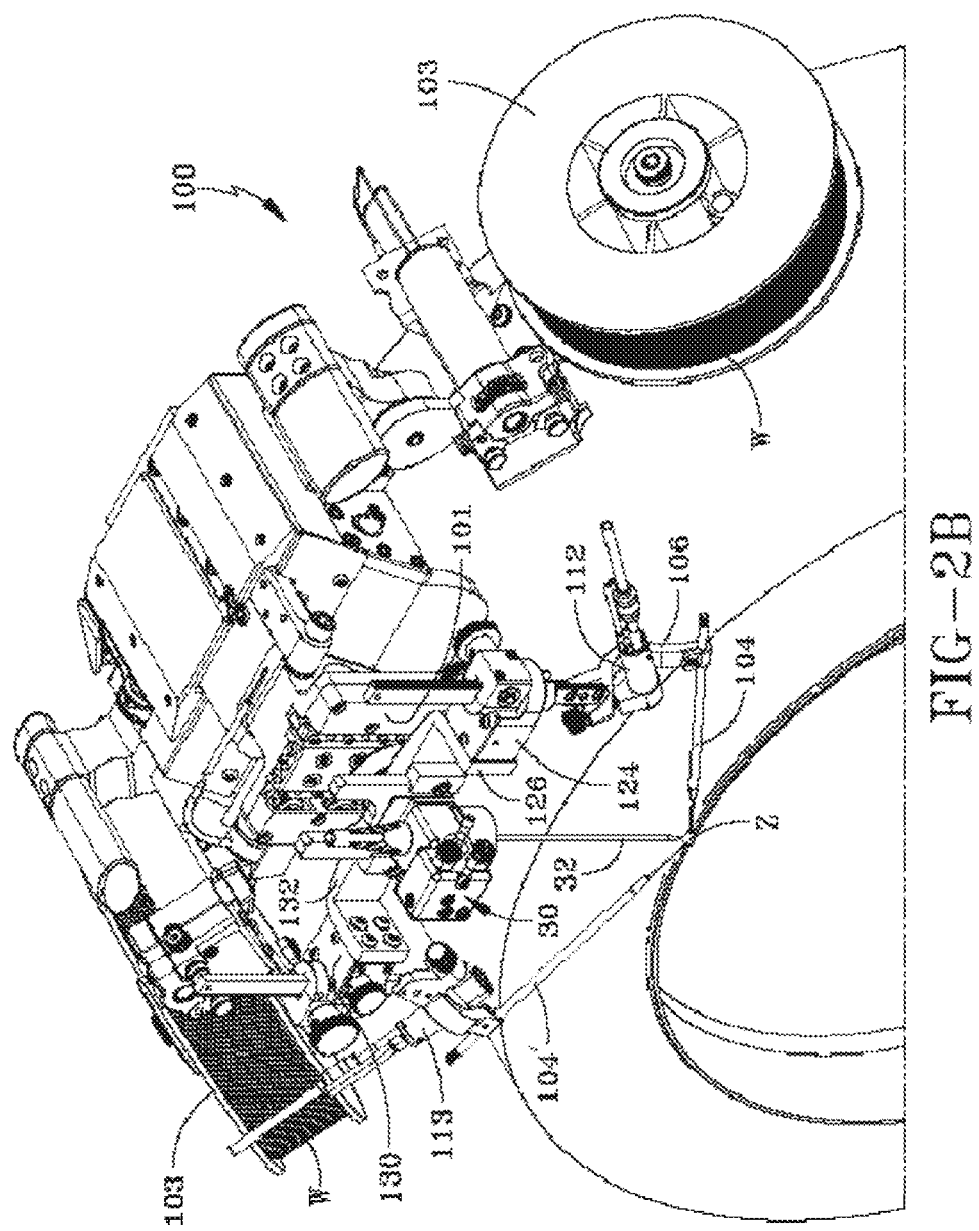
FIG. 2B illustrates a perspective view of an orbital welding system.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIGS. 1-5 illustrate a welding system that is used with an automated or semi-automated welding system. One illustrative example of a welding system is orbital welding, which is often used for the joining of tubes or pipes of various types of materials. For example, a Tungsten Inert Gas (TIG) or Gas Tungsten Arc Welding (GTAW) welding torch may be used to orbit around the pipes to be welded together by an automated mechanical system. FIGS. 1-2B illustrate an example embodiment of orbital welding system 100 (also referred to as welder, system, welding system, and/or welder system) as used in an orbital welding environment. Orbital welding system 100 includes a welding tractor (not shown) that travels around the pipes or tubes, a welding power source (not shown) and controller (not shown), and a pendant (not shown) providing operator control. It is to be appreciated that the subject innovation can be used with any orbital or non-orbital welding system. Moreover, the subject innovation can be used with any welding operation that includes an arc and a hot wire that is liquefied to deposit welding material onto a workpiece.

System 100 (as seen in FIGS. 1-2B) is generally used in deep groove welding. In the example shown, welding system 100 includes an orbital TIG welder having a welder body or chassis 101, which may be attached to the work piece or supported on a track. Welder 100 includes a welding torch, generally indicated at 30, having a welding electrode 32 for depositing weld material to form a weld joint at welding zone Z. Electrode 32 is an extended electrode having an electrode length suitable for the groove G being welded. Extended electrode 32 may have any length suitable for a given deep groove weld, including lengths greater than 10 millimeters. As depicted in the example shown, electrode length may be greater than 100 millimeters. The particular example shown has a length of about 120 millimeters. This example is not limiting as electrodes having greater or lesser lengths may be used depending on the depth of the groove G.

Welding torch 30 is connected to a shield gas supply 102, that provides an inert gas, such as Argon gas, to welding torch 30. Welding gas supply 102 may include a container, such as a cylinder, that stores shield gas S under pressure, and delivery of shield gas S, via appropriate tubing or other conduits, may be controlled by a regulator or other controller 107. A non-pressurized source may be used also with gas delivery provided by a pump or the like. When welding thick plates or heavy wall pipes, the weld joint design typically provides a narrow groove to permit an elongated electrode to be placed in the joint with some adjustment of the torch angle to assure a good weld created by layering a series of weld beads upon each other until the joint is filled. This process may be referred to as narrow groove welding or deep groove welding interchangeably throughout the following description. Narrow groove welding is a process where successive single bead weld layers are applied on top of one another in a narrow groove or joint. One of the considerations in the narrow groove environment is maintaining sufficient shield gas to protect the molten weld puddle from atmospheric contamination. Typically, an inert shield gas, such as Argon, is provided from outside the weld joint with a long electrode extending into the groove below the shield gas supply.

The welder may include a wire feeder connected to a supply of welding wire, such as a spool 103 that provides tungsten wire W to one or more wire guides 104', 104. In the example shown, a pair of extended wire guides 104', 104 are provided and fed by independent spools 103 located on either side of chassis 101. The extended wire guides 104', 104 are supported on first camera device and wire guide system 105 (also referred to as first mount system 105) and second camera device and wire guide system 106 (also referred to as second mount system 106) respectively that are each laterally outward of electrode 32 and above the workpiece or pipe P. It is to be appreciated that the support for the extended wire guides 104', 104 can be chosen with sound engineering judgment without departing from the intended scope of coverage of the embodiments of the subject invention.

The orbital welding system can include wire guides 104', 104 can include a position device that provides automated or semi-automated motion, wherein the motion can be in any direction within a 3-dimensional environment in proximity to an arc created within welding zone Z. For instance, the wire guides 104', 104 can extend inward and downward toward electrode 32 and welding zone Z. The example welder is supported on a track and drive by a tractor drive around pipe (also referred to as workpiece W) with wire guides 104', 104 being located in lead and lag positions relative to welding electrode 32. In an embodiment, first mount system 105 is coupled to height adjustment device 130 that allows adjustment of first mount system 105 toward welding zone Z or away welding zone Z. It is to be appreciated that the adjustment toward welding zone Z or away welding zone Z can be automated or semi-automated. Further, the adjustment can be to a side of the welding zone Z or to an opposite side of the welding zone Z (e.g., a left motion, a right motion, etc.). Height adjustment device 130 is further coupled to support member 132 that is coupled to a portion of chassis 101 of welder system 100. Similarly, second mount system 106 is coupled to height adjustment device 124 that allows adjustment of second mount system 106 toward welding zone Z or away welding zone Z. It is to be appreciated that the adjustment toward welding zone Z or away from welding zone Z can be automated or semi-automated. Further, the adjustment can be to a side of the welding zone Z or to an opposite side of the welding zone Z (e.g., a left motion, a right motion, etc.). Height adjustment device 124 is further coupled to support member 126 that is coupled to a portion of chassis 101 of welder system 100.

First mount system 105 supports camera device 113 and wire guide 104', wherein both camera device 113 and wire guide 104' are positioned to aim on or toward welding zone Z. Similarly, second mount system 106 supports camera device 112 and wire guide 104, wherein both camera device 112 and wire guide 104 are positioned to aim on or toward welding zone Z. It is to be appreciated that system 100 includes camera device 112 and camera device 113 but such devices are solely for illustrating various embodiments and are not to be considered limiting on the subject innovation. It is to be appreciated that camera device 113 and wire guide 104' move together (or independently) with welder system 100 which enables supply of welding wire consistently at welding zone Z and/or where wire is fed from wire guide 104'. It is to be appreciated that camera device 112 and wire guide 104 can move together (or independently) with welder system 100, which enables supply of welding wire consistently at welding zone Z and/or where wire is fed from wire guide 104' and ultimately from wire feeder (wire supply or spool 103).

Figure 3A:
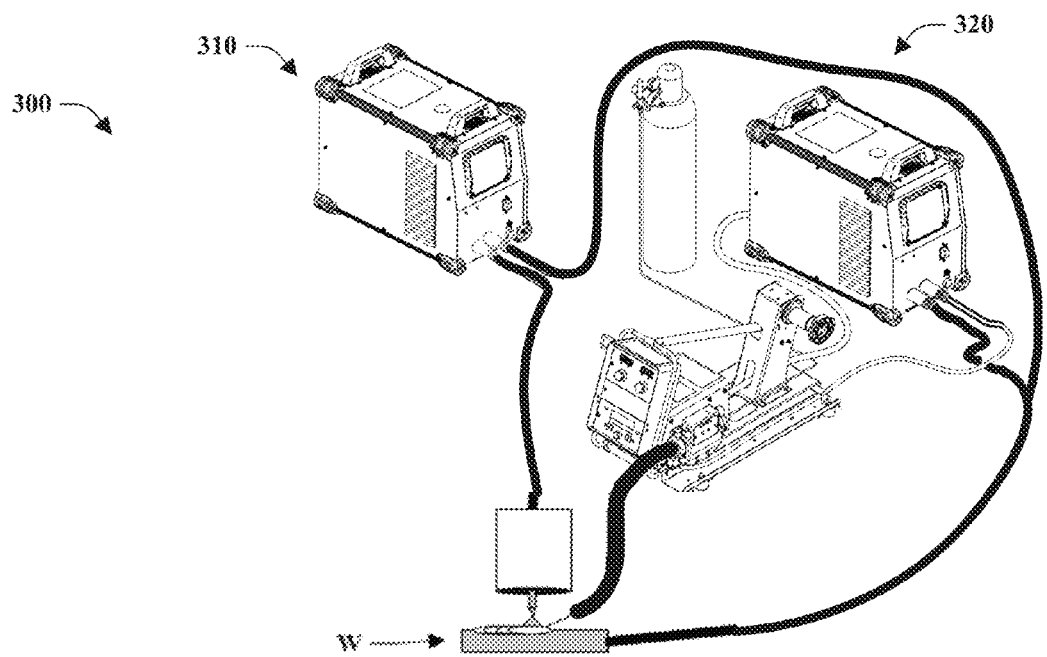
FIG. 3A is a diagram illustrating portion of a hot wire welding system.
Figure 3B:
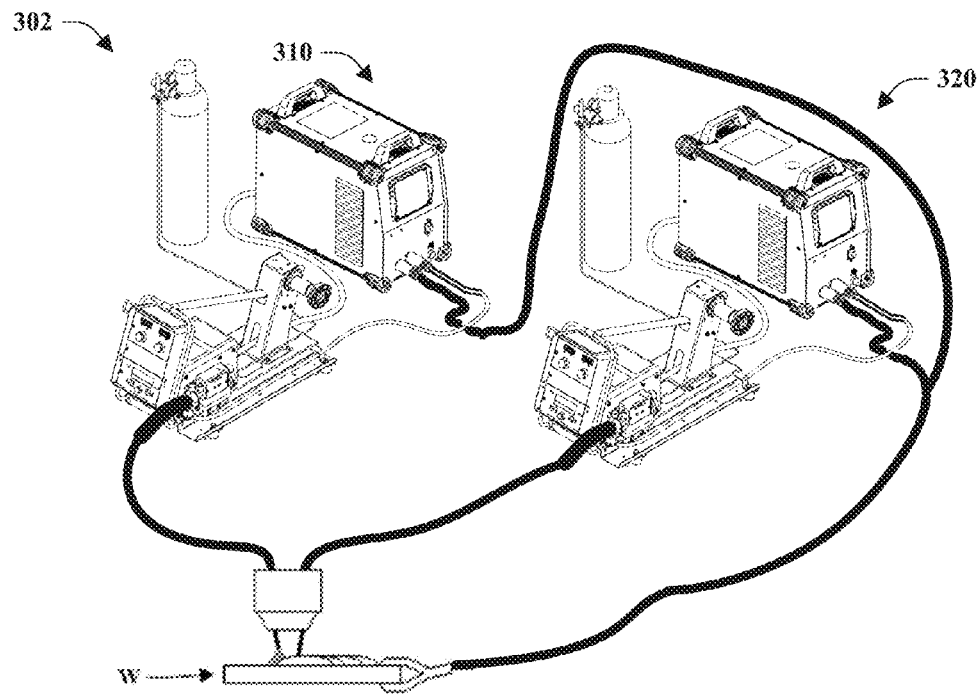
FIG. 3B is a diagram illustrating portion of a hot wire welding system.

FIGS. 3A and 3B illustrate diagrams of a hot wire welding system 300 and a hot wire welding system 302 in accordance with the subject innovation. For instance, hot wire welding system 300 can be a TIG welding system and hot wire welding system 302 can be a MIG welding system. As discussed above, it is to be appreciated and understood that any suitable hot wire welder system can be implemented with the subject innovation and such systems in FIGS. 1-3B are not to be limiting on the scope of the subject claims. System 300 includes a first power supply 310 that provides a first heat source to create an arc between an electrode (e.g., a non-consumable electrode for instance) and a workpiece W, wherein a puddle is created by the electrode. System 300 further includes hot wire power supply 320 (e.g., welding wire power supply) that heats a welding wire fed into a puddle formed by the electrode. In other words, hot wire power supply 320 can energize a welding wire that is fed or delivered into the puddle to deposit welding material (e.g., liquefied welding wire) onto workpiece W.

System 302 includes a first power supply 310 that provides a first heat source to create an arc between an electrode (e.g., a non-consumable electrode for instance) and a workpiece W, wherein a puddle is created by the electrode. System 302 further includes hot wire power supply 320 (e.g., welding wire power supply) that heats a welding wire fed into a puddle formed by the electrode. In other words, hot wire power supply 320 can energize a welding wire that is fed or delivered into the puddle to deposit welding material (e.g., liquefied welding wire) onto workpiece W. It is to be appreciated that welding systems 100, 300 and 302 can be chosen and used with sound engineering judgment without departing from the intended scope of coverage of the embodiments of the subject invention.

It is to be appreciated that systems 300 and 302 can be a hot wire TIG welder system or a hot wire tandem welder system. The subject innovation can relate to an arc that is created by any suitable wire processes, wherein such wire processes can include non-consumable electrode processes.

Figure 4:
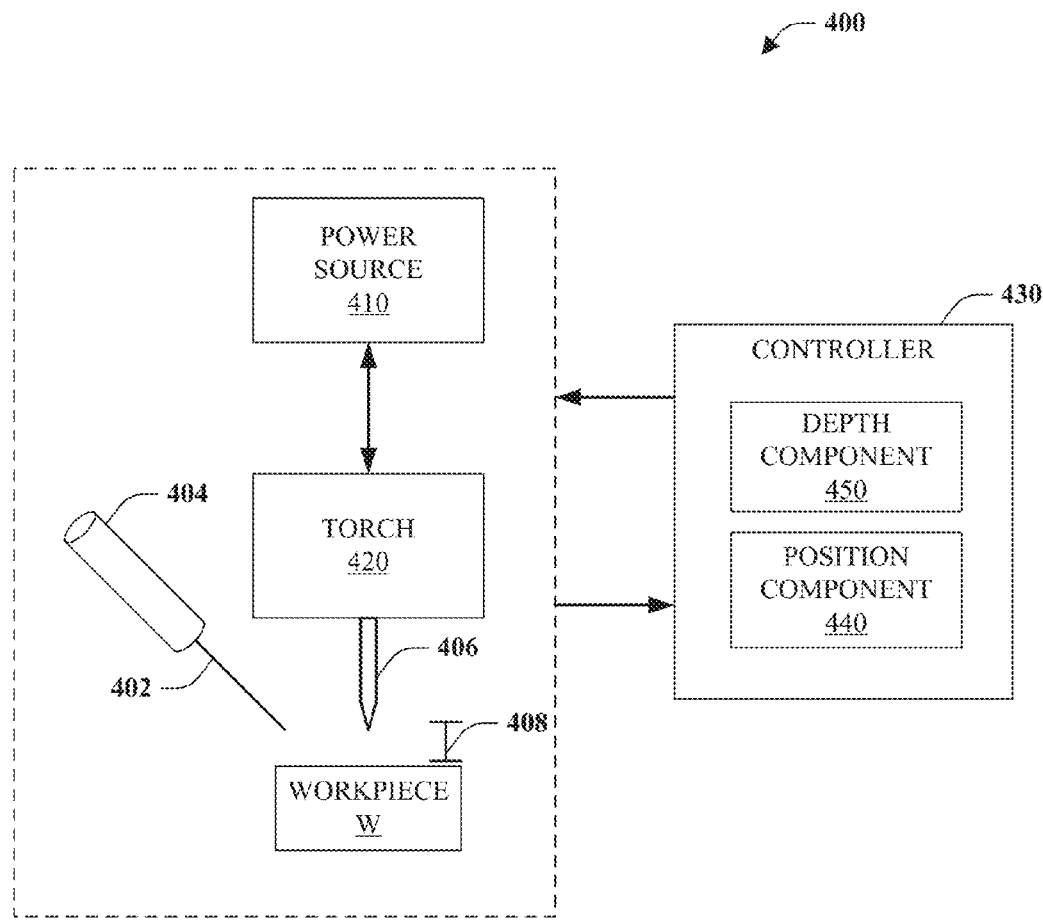
FIG. 4 is a diagram illustrating a welder system that adjusts a welding operation based on a detected change in height between an electrode and a workpiece.

FIG. 4 illustrates welder system 400 (also referred to as system 400) that adjusts a welding operation based on a detected change in height between an electrode and a workpiece. System 400 includes wire guide 404 that directs welding wire 402 to a welding zone that includes an arc that is generated between electrode 406 and workpiece W. Torch 420 in system 400 includes electrode 406 in which power source 410 creates the arc between electrode 406 and workpiece W. Torch 420 has a height 408 that is a distance between electrode 406 and workpiece W (and included height of material deposited from the welding operation), wherein height 408 can be referred to as contact tip to work distance, torch head space, stick out, and the like. For the purposes of this subject innovation, the distance from electrode 406 and workpiece W is referred to as height 408, height of electrode to workpiece W, and/or distance between electrode 406 and workpiece W, wherein the distance includes material deposited onto workpiece W (discussed below). In particular, height 408 can be adjusted by at least changing a position of torch 420 relative to workpiece W, changing a position of workpiece W relative to torch 420, or a combination thereof. Electrode 406 can be a consumable electrode or a non-consumable electrode. In a particular embodiment, system 400 can be an orbital welding system that utilizes a non-consumable electrode.

Welding system 400 can perform various welding operations on workpiece W. For instance, welding system 400 can perform a welding operation on workpiece W that has a curvature. For instance, workpiece W can be a pipe or a portion of a pipe. Welding system 400 can perform a welding operation on at least one of an inside diameter of workpiece W or an outside diameter of workpiece W. In either example of an inside diameter welding operation or an outside diameter welding operation, the welding operation can include depositing material onto workpiece W more than one time. For instance, on a welding operation for a pipe (e.g., inside diameter welding operation or outside diameter welding operation), two or more revolutions may be performed in which material is deposited onto the pipe. In other words, a first revolution can include a first deposited layer of material onto the pipe, a second revolution can include a second deposited layer of material onto the first deposited layer, a third revolution can include a third deposited layer of material onto the second deposited layer, and so on and so forth. By way of example, a welding operation (e.g., inside diameter welding operation or outside diameter welding operation) can be a welding sequence that includes at least one of the following: at least one root weld; at least one fill weld; or at least one cap weld. At the first revolution of the welding operation, height 408 is a distance between workpiece W and electrode 406. At a subsequent revolution of the welding operation, height 408 is a distance between electrode 406 and material deposited onto workpiece W from the welding operation. The change in distance between electrode 406 and material deposited onto workpiece W from the welding operation is utilized by the subject innovation to provide an accurate electrode speed (e.g., "true" electrode speed) and adjust one or more welding parameters to compensate accordingly. Conventional techniques set an electrode speed at a start of a welding operation and do not adjust such electrode speed, communicate such electrode speed should change, and simply maintain such electrode speed which is detrimental to the welding operation. It is to be appreciated that such change in height 408 can affect the welding operation. In a particular embodiment, a pipe having a diameter less than 72 inches is affected by the change in height 408 due to welding material deposited onto workpiece W.

System 400 can include controller 430 that is configured to control a portion of a welding operation. It is to be appreciated that controller 430 can be a stand-alone component (as depicted), incorporated into power source 410, incorporated into torch 420, or a combination thereof. In particular, controller 430 can adjust at least one parameter related to a welding operation performed on workpiece W while compensating for a change of height 408 detected during performance of a welding operation. By way of example and not limitation, controller 430 can control settings related to power source 410, position and/or settings related to torch 420, position and/or settings related to wire feed guide 404, and/or position related to workpiece W. For instance, controller 430 can adjust a welding parameter via power source 410 such as, but not limited to, arc voltage, arc current, arc polarity, among others. In an embodiment, power source 410 or additional power source (not shown) can be used to supply a current to wire 402, wherein the current can include a polarity. In such embodiment, controller can control at least one of power source 410 and/or additional power source to manage wire current, wire voltage, wire polarity, among others. In still another embodiment, controller 430 can adjust a physical location (e.g., position) of at least one of torch 420, wire guide 404, and/or workpiece W.

Controller 430 can include position component 440. It is to be appreciated that position component 440 can be a stand-alone component, incorporated into controller 430 (as depicted), incorporated into torch 420, incorporated into power source 410, incorporated depth component 450, or a combination thereof. Position component 440 can provide movement for torch 420 and/or workpiece W in any direction around the arc, toward the arc, among others. By way of example and not limitation, position component 440 can provide movement for a tractor welder affixed to workpiece W or on a track affixed to workpiece W, an oscillating movement, a motion to a side of the arc, a motion to an opposite side of the side of the arc, a motion toward the arc, a motion away from the arc, a motion above the arc, a motion below the arc, or a combination thereof. In an embodiment, torch 420 includes position component 440 that maneuvers about workpiece W. Position component 440 can maneuver torch 420 adjacent to workpiece W on a track affixed to workpiece W. In particular, position component 440 can maneuver a tractor welder about a track affixed to workpiece W, wherein the movement of the tractor welder is reflective of electrode speed (e.g., electrode speed is a rate that the electrode moves adjacent to the workpiece).

In another embodiment, position component 440 can change the location of workpiece W in relation to electrode 406. For instance, workpiece W can be rotated under/below torch 420 in, for example, an automation environment. In still another embodiment, position component 440 can be a welder seamer. In still another embodiment, position component 440 can be utilized with wire guide 404 and/or welding wire 402 to change a position or location at which welding wire is delivered to the arc. Still, position component 440 and various configurations thereof can be chosen and used with sound engineering judgment without departing from the intended scope of coverage of the embodiments of the subject invention.

Controller 430 can include depth component 450 that is configured to detect a change in height 408 due to material deposited onto workpiece W. As discussed above, a welding operation can include revolutions about workpiece W such that material deposited on a first revolution changes height 408 on a second revolution. In such case, depth component 450 can detect a change in height 408. By way of example and not limitation, depth component 450 can be a height encoder, a device that measures a distance from electrode 406 to workpiece W, a feedback system to get distance, a laser device, a laser that measures distance, a depth meter, a potentiometer that measures a voltage to detect position of torch 420, a electronic device or component that measures a current to detect a position of torch 420, a component that measures distance, among others.

In a particular embodiment, a height encoder (not shown) can be incorporated with torch 420 such that height encoder detects height 408 based on positioning data on a first revolution of a welding operation compared to positioning data on a subsequent revolution of the welding operation. For instance, a first revolution can include a first height which is stored (e.g., temporary storage, permanent storage, among others) and a second revolution can include a second height which is also stored (e.g., temporary storage, permanent storage, among others). In such instance, the first height and the second height can be compared to detect a change in height which is used to adjust a welding parameter. It is to be appreciated that a trigger can initiate the storage of the first height and/or the second height which can be associated with at least one of a physical location on workpiece W, a predetermine time during a welding operation, a user input that initiates height detection, a dynamic collection of height from start to stop of welding operation, among others.

Based on a detected change of height 408 due to a material deposited onto workpiece W, controller 430 can adjust (e.g., increase, decrease, maintain, among others) one or more welding parameters. It is to be appreciated that the welding parameter can be, but is not limited to being, an electrode speed, an arc voltage, a travel speed of a tractor welder that performs the welding operation, a wire feed speed, an arc current level, a height of torch 420, a distance between workpiece W and torch 420, an oscillation width of electrode 406, a temperature of welding wire, a temperature of electrode 402, a frequency of oscillation of electrode 406, a polarity of the arc current, a polarity of the current for welding wire 402, and the like.

In an embodiment, controller 430 can utilize a first electrode speed on a first revolution of a welding operation on workpiece W and a second electrode speed on a subsequent revolution of the welding operation, wherein the second electrode speed is increased a portion more than the first electrode speed due to a detected change of height 408 due to material deposited onto workpiece W. In another embodiment, controller 430 can adjust one or more welding parameters rather than electrode speed to compensate for the detected change in height 408.

Figure 5:
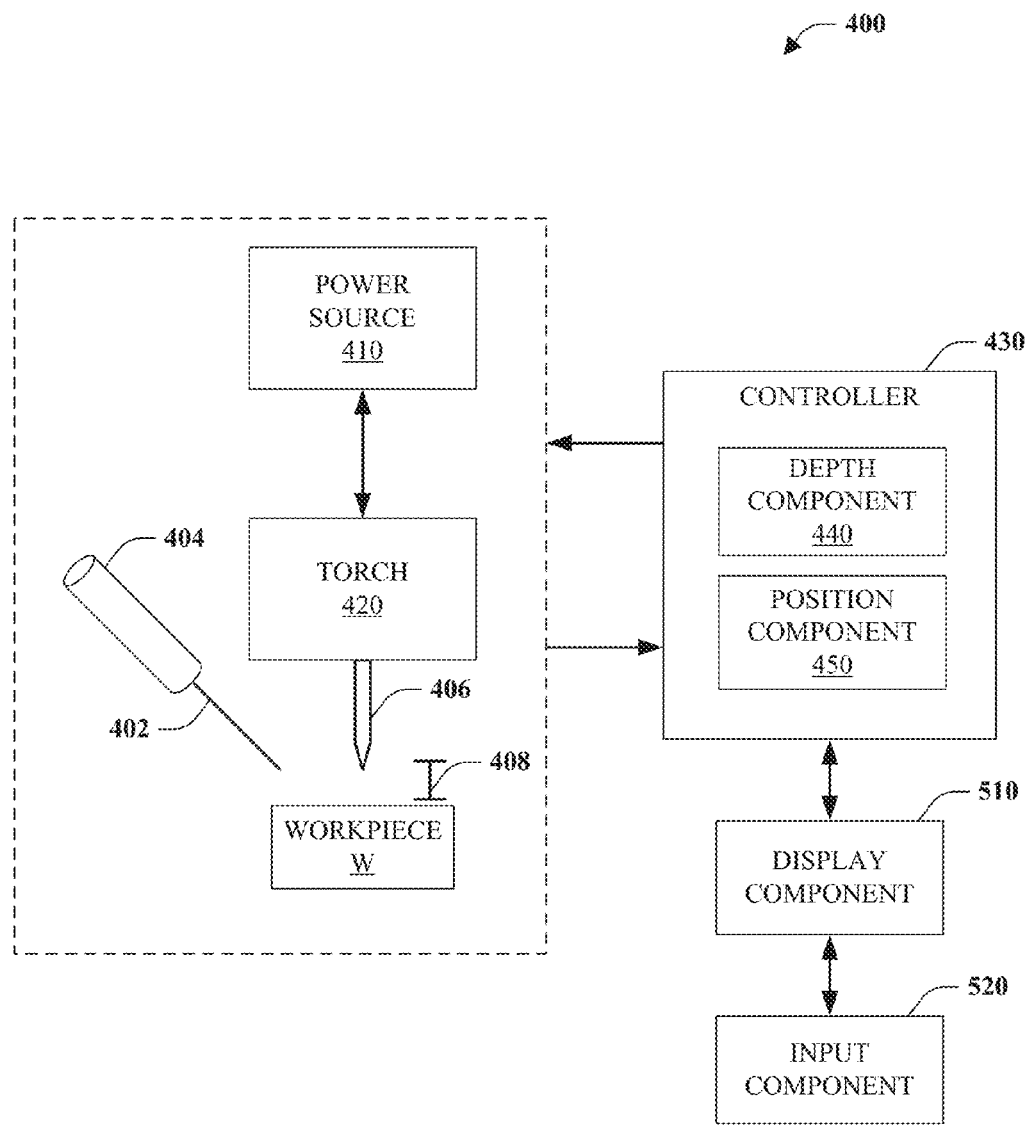
FIG. 5 is a diagram illustrating a welder system that identifies an electrode speed based on a change in height between an electrode and a workpiece due to material deposited from a welding operation.

FIG. 5 illustrates an embodiment of welder system 400 that identifies an electrode speed based on a change in height between an electrode and a workpiece due to material deposited from a welding operation and communicates an electrode speed. Embodiment illustrated in FIG. 5 can include display component 510 to communicate electrode speed and input component 520 that is configured to receive an input from at least one of a user, an operator, a machine, a computing device, among others, wherein such input selects an operation mode in which electrode speed is displayed. For instance, the electrode speed can be displayed as an accurate electrode speed which takes into account a change of height 408 (also referred to as "true electrode speed") or an electrode speed that does not take into account a change of height 408. Input component 520 can be, but is not limited to being, a button, a switch, a toggle switch, a knob, an analog knob, a touchpad, a touch screen, a mouse, a mouse button, a keyboard, a keypad, a microphone, a camera, a video camera, a motion sensor, and the like. In general, input component 520 can receive an input from a user or an operator to control a type of electrode speed to display for welding system 400. For instance, the input can be, but is not limited to being, a button activation, a switch activation, a voice command, a motion, a gesture, a hand gesture, an eye movement, a sound, a touch screen input, and the like. The input received via input component 520 can be a value or a setting for a welding parameter for welding system 400.

Further, display component 510 can render a portion of a graphic related to at least electrode speed for display and can, in an embodiment, include a speaker for audio (e.g., audible communication of electrode speed). For instance, display component 510 can illustrate graphics related to settings, welding parameters, welding modes, positions of a tractor welder, user settings, types of welding, and the like. Display component 510 can include a video graphics engine and a display, wherein the display can be, but is not limited to, a screen, a CRT, an LCD, a plasma screen, a dot matrix screen, a monitor, etc. In an embodiment, display component 510 is external to welding system 400 and a wired or wireless connection is used to render graphics for display. For instance, welding system 400 can include a port (e.g., video port, graphics port, HDMI, VGA, serial, S-Video, USB, component, etc.) to connect to an external device for display of data. For instance, welding system 400 can connect to a tablet for display of data via a wired or wireless connection. It is to be appreciated that welding system 400 can utilize an internal display and/or external display and such examples are not limiting on the subject innovation.

FIGS. 6-8 illustrate a welding operation on a cross-sectional view of a pipe (workpiece W), wherein the welding operation includes two or more revolutions of depositing material onto the pipe. It is to be appreciated that a welding sequence can include a first revolution and one or more subsequent revolutions in which a change in height is from material deposited onto workpiece W (here, a pipe or a workpiece with a curved surface). Cross-sectional view in FIGS. 6-8 can include orbital welder 100 that can be a tractor welder that moves adjacent to workpiece W on track 602. Orbital welder 100 can include electrode 406 that includes height (not shown) between electrode 406 and surface 604 of workpiece W (e.g., pipe). It is to be appreciated that height is discussed above and not shown on FIGS. 6-8 due to scaling. Moreover, FIGS. 6-8 are not to scale.

Additionally, it is to be appreciated that an outer diameter welding operation is illustrated as an example and that an inner diameter welding operation can be performed with the subject innovation. In other words, a change of height detected during an inner diameter welding operation or an outer diameter welding operation can trigger an adjustment to a welding parameter to compensate for such change. For instance, material deposited on workpiece during an inner diameter welding operation can decrease an inner radius and a distance to travel for electrode 406. For instance, material deposited on workpiece during an outer diameter welding operation can increase an outer radius and a distance to travel for electrode 406.

A welding operation can include two or more revolutions on workpiece W from surface 604 to achieve target weld 606, wherein target weld 606 can be a desired amount of welding material deposited onto workpiece W (e.g., a measurement of a desired amount of welding material deposited onto workpiece W). FIG. 6 illustrates the welding operation at a start in which no welding material has deposited onto surface 604. Turning to FIG. 7, a first revolution of orbital welder 100 deposits first layer of welding material 608 onto surface 604. Due to first layer of welding material 608 onto surface 604, height between electrode 406 and workpiece W has changed. In other words, after depositing first layer of welding material 608 onto workpiece W, the distance between electrode 406 and first layer of welding material 608 is smaller than the distance between electrode 406 and surface 604 (prior to deposit of first layer of welding material).

Welding sequence can include a first revolution of depositing welding material onto workpiece W and subsequent revolutions of depositing welding materials onto workpiece W to achieve target weld 606. As illustrated in FIG. 8, subsequent revolutions and layers of welding material can be used to achieve target weld 606, wherein change of height can be dynamically identified and compensated by adjusting one or more welding parameters.

In an example, an inner diameter welding operation can include a change in height from welding material deposited, wherein an electrode speed can be decreased to compensate for the change in height. In an example, an outer diameter welding operation can include a change in height from welding material deposited, wherein electrode speed can be increased to compensate for the change in height.

In an embodiment, the change in height is from the layer of material deposited onto the pipe while depositing an additional layer onto the pipe. In an embodiment, the welding torch performs the welding operation with two or more deposits of material onto the pipe. In an embodiment, each of the two or more deposits of material correspond to a respective revolution around the pipe. In an embodiment, the two or more deposits of material are a welding sequence for the pipe. In an embodiment, the welding sequence includes at least one of the following: at least one root weld; at least one fill weld; or at least one cap weld.

In an embodiment, the system can include an input component that receives a selection to display the second electrode speed or the first electrode speed. In an embodiment, the system can include a display component that renders a portion of a graphic related to the first electrode speed and the second electrode speed. In an embodiment, the portion of the graphic includes at least one of a text, a number, a letter, a symbol, or a displayed pixel.

In an embodiment, the controller is configured to adjust a welding parameter of the welding operation based on the change in the height. In an embodiment, the welding parameter is at least one of the first electrode speed, the second electrode speed, an arc voltage, a wire feed speed, a welding torch height relative to the pipe, an arc current level, an oscillation rate of the electrode, an oscillation width of the electrode, a temperature of welding wire, a temperature of the electrode, a polarity of a current of the arc, a polarity of a current of welding wire, a physical location of the workpiece, or a physical location of the welding torch. In an embodiment, the second electrode speed is greater than the first electrode speed for the welding operation that is an outer diameter welding operation and the second electrode speed is less than the first electrode speed for the welding operation that is an inner diameter welding operation.

Conventional travel calibration is not consistent as a system welds out a pipe. The subject innovation provides a digital platform in which the system can travel a specific speed regardless of a pipe diameter.

In an embodiment, on an 18" pipe with a 3" wall thickness, the distance the electrode will be traveling at the beginning of the weld is 37.70". As more material is added from the welding operation, the distance gets closer to 56.55". For instance, the first pass is 12" diameter, the second pass is 12.3" diameter, the third pass is 12.6" diameter, and so on. In other words, each pass adds more material from the welding material being deposited onto the pipe or workpiece thus increasing the distance traveled.

Based on the material added, the electrode travels faster in relation to the movement across the pipe. With each pass, the electrode is moving at the same speed relative to the track ring, but it is covering more ground. Following the example above, the first pass is 12" with a circumference (circ) of 37.68" 20 inches per minute (ipm), the second pass is 12.3 circ 38.87" 20 ipm, and the third pass is 12.6 circ 39.56" 20 ipm, and so on.

The distance gets larger and the speed relative to the track ring stays constant, while the distance traveled increases which increases the electrode speed relative to the workpiece (here the pipe). For instance, the following illustrates the increase in electrode speed relative to the workpiece (note the electrode speed relative to workpiece increases):

| Ring Size | True Diameter | Electrode (relative to track) | Electrode (relative to workpiece) |
|---|---|---|---|
| 1$^{st}$ pass 12" | Circ 37.70" | 20 ipm | 20.00 ipm |
| 2$^{nd}$ pass 12.3" | Circ 38.64" | 20 ipm | 20.50 ipm, 2.5% error |
| 3$^{rd}$ pass 12.6" | Circ 39.58" | 20 ipm | 21.00 ipm, 5.0% error |
| 6$^{th}$ pass 13.5" | Circ 42.41" | 20 ipm | 22.50 ipm, 12.5% error |

It is to be appreciated that there can be a variance throughout the weld (e.g., material deposited) because the height control can change the circumference that is traveled depending on how much weld material is added in. This can be seen in the example above in the second, third, and sixth pass.

The subject innovation can calculate the height, which will adjust the speed automatically. The system can include a user input (or machine input) for the initial travel size of the pipe. In this example, the user or machine can provide the system that the weld will be at 20 ipm for a pipe whose ID is 12". As the height is adjusted during the weld, the system can recalculate so that the system will maintain that electrode speed relative to workpiece as illustrated below:

| Ring Size | True Diameter | Electrode (relative to track) | Electrode (relative to workpiece) |
|---|---|---|---|
| 1$^{st}$ pass 12" | Circ 37.70" | 30.00 ipm | 20.00 ipm |
| 2$^{nd}$ pass 12.3" | Circ 38.64" | 29.27 ipm | 20.00 ipm |
| 3$^{rd}$ pass 12.6" | Circ 39.58" | 28.57 ipm | 20.00 ipm |
| 6$^{th}$ pass 13.5" | Circ 42.41" | 26.67 ipm | 20.00 ipm |

Rather than traveling at a constant speed throughout (as conventional systems do which leads to the electrode of the conventional system going faster the more material is added). The subject innovation can effectively slow the electrode (relative to track) down to maintain the desired welding speed (e.g., electrode relative to workpiece speed).

The system provides this feature by calculating the height variance and having a machined track ring that is a fixed circumference. The system automatically calculates this distance traveled and adjusts each time the height value changes in order to compensate the electrode speed (relative to workpiece) accordingly. This gives us the ability to calculate the true electrode speed throughout the weld on the workpiece.

For instance, with a track ring size, a pipe size, a desired travel speed on the pipe, and a ring offset from specified size can be used to calculate an input travel speed. In an embodiment, this can be calculated by the following: (((ring offset from specified size * 2)+track ring size)+(desired travel speed on pipe/ pipe size)).

In a particular example, a pipe can be 18" can be welded with a ring size of 18" and a desired speed of 20 inches per minute (ipm). This example illustrates the offset from one specific pipe size as the joint is welded out. This shows an example of a 18" pipe that with a 3" wall thickness, thus an inner diameter (ID) of 12". Based on the calibration of the system being done on the surface of the pipe, it can be seen at the root the welder is traveling 50% from a command travel speed. Table 1, below, illustrates this example:

TABLE 1

| Pass Number | Diameter | Ring speed for constant electrode Electrode Speed | Speed offset | % speed off | Electrode Circumference | electrode speed with constant ring speed | Travel Speed Error |
|---|---|---|---|---|---|---|---|
| 1 | 12 | 30.00 | 10.000 | 50% | 37.7 | 20 | |
| 2 | 12.3 | 29.27 | 9.268 | 46% | 38.64 | 20.50 | 2.50% |
| 3 | 12.6 | 28.57 | 8.571 | 43% | 39.58 | 21.00 | 5.00% |
| 4 | 12.9 | 27.91 | 7.907 | 40% | 40.53 | 22 | 7.50% |

TABLE 1-continued

| Pass Number | Diameter | Ring speed for constant electrode Electrode Speed | Speed offset | % speed off | Electrode Circumference | electrode speed with constant ring speed | Travel Speed Error |
|---|---|---|---|---|---|---|---|
| 5 | 13.2 | 27.27 | 7.273 | 36% | 41.47 | 22.00 | 10.00% |
| 6 | 13.5 | 26.67 | 6.667 | 33% | 42.41 | 22.50 | 12.50% |
| 7 | 13.8 | 26.09 | 6.087 | 30% | 43.35 | 23 | 15.00% |
| 8 | 14.1 | 25.53 | 5.532 | 28% | 44.3 | 23.50 | 17.50% |
| 9 | 14.4 | 25.00 | 5.000 | 25% | 45.24 | 24.00 | 20.00% |
| 10 | 14.7 | 24.49 | 4.490 | 22% | 46.18 | 25 | 22.50% |
| 11 | 15 | 24.00 | 4.000 | 20% | 47.12 | 25.00 | 25.00% |
| 12 | 15.3 | 23.53 | 3.529 | 18% | 48.07 | 25.50 | 27.50% |
| 13 | 15.6 | 23.08 | 3.077 | 15% | 49.01 | 26 | 30.00% |
| 14 | 15.9 | 22.64 | 2.642 | 13% | 49.95 | 26.50 | 32.50% |
| 15 | 16.2 | 22.22 | 2.222 | 11% | 50.89 | 27.00 | 35.00% |
| 16 | 16.5 | 21.82 | 1.818 | 9% | 51.84 | 28 | 37.50% |
| 17 | 16.8 | 21.43 | 1.429 | 7% | 52.78 | 28.00 | 40.00% |
| 18 | 17.1 | 21.05 | 1.053 | 5% | 53.72 | 28.50 | 42.50% |
| 19 | 17.4 | 20.69 | 0.590 | 3% | 54.66 | 29 | 45.00% |
| 20 | 17.7 | 20.34 | 0.339 | 2% | 55.61 | 29.50 | 47.50% |
| 21 | 18 | 20.00 | 0.000 | 0% | 56.55 | 30.00 | 50.00% |

Figure 9:
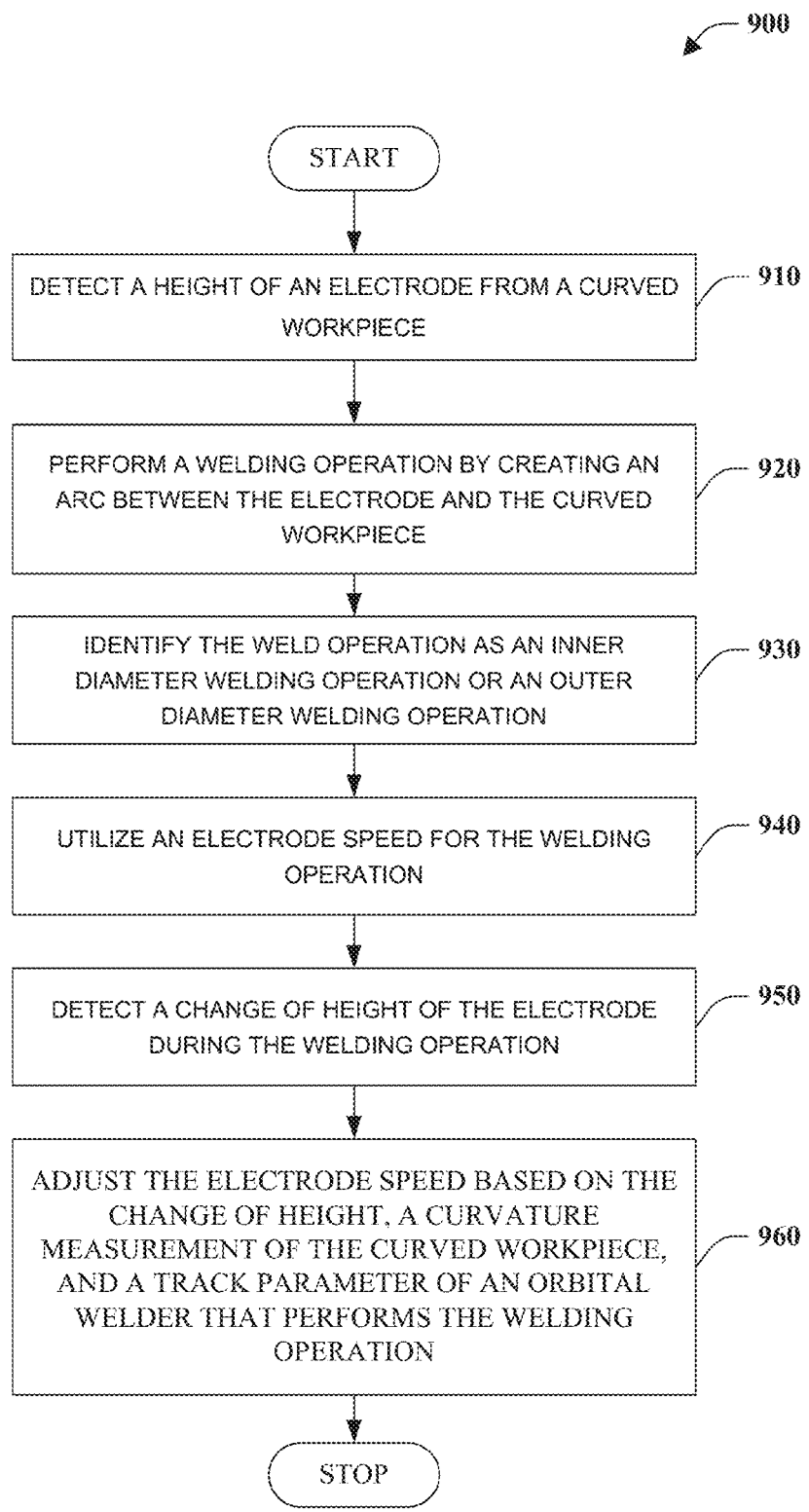
FIG. 9 is a flow diagram of controlling an arc current of an arc in a welding operation based on a received user input.

In view of the exemplary devices and elements described supra, methodologies that may be implemented in accordance with the disclosed subject matter will be better appreciated with reference to the flow charts and/or methodologies of FIG. 9. The methodologies and/or flow diagrams are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods and/or flow diagrams described hereinafter.

FIG. 9 illustrates method 900 that automatically adjusts a welding parameter based on a change of height between an electrode and a workpiece during a welding operation. Sequentially, the following occurs as illustrated in the decision tree flow diagram 900 of FIG. 9 which is a flow diagram 900 that provides performing a welding operation. For example, a welding operation can include at least the following: creating an arc between an electrode and a workpiece; delivering a welding wire to a puddle formed by the electrode; and depositing the welding wire onto the workpiece (also referred to depositing material onto the workpiece).

A height of an electrode from a curved workpiece can be detected (reference block 910). A welding operation can be performed by creating an arc between the electrode and the curved workpiece (reference block 920). The weld operation can be identified as an inner diameter welding operation or an outer diameter welding operation (reference block 930). An electrode speed can be utilized for the welding operation (reference block 940). A change of height of the electrode can be detected during the welding operation (reference block 950). The electrode speed can be adjusted based on the change of height, a curvature measurement of the curved workpiece, and a track parameter of an orbital welder that performs the welding operation (reference block 960).

In an embodiment, a method can further include adjusting the electrode speed further comprises: increasing a tractor welder rate of motion on a track; decreasing a tractor welder rate of motion on a track; increasing a rate of motion of the workpiece; or decreasing a rate of motion of the workpiece.

In an embodiment, a method can further include adjusting a welding parameter based on the change of height. In an embodiment, the track parameter is at least one of a length of a track used with the orbital welder, a distance of a track used by the orbital welder to the curved workpiece, an inner diameter placement of a track used with the orbital welder, or an outer diameter placement of a track used with the orbital welder. In an embodiment, the curved workpiece is a pipe.

In an embodiment, a method can further include the step of adjusting is an increase in the electrode speed. In an embodiment, the change of height is from a material deposit from at least one of an electrode used with the welding operation or a wire used with the welding operation.

While the embodiments discussed herein have been related to the systems and methods discussed above, these embodiments are intended to be exemplary and are not intended to limit the applicability of these embodiments to only those discussions set forth herein. The control systems and methodologies discussed herein are equally applicable to, and can be utilized in, systems and methods related to arc welding, laser welding, brazing, soldering, plasma cutting, waterjet cutting, laser cutting, and any other systems or methods using similar control methodology, without departing from the spirit of scope of the above discussed inventions. The embodiments and discussions herein can be readily incorporated into any of these systems and methodologies by those skilled in the art.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A welder system, comprising:
    a welding torch detachably coupled to a track affixed adjacently to a workpiece, wherein the welding torch includes an electrode to perform a welding operation to deposit a layer of material onto the workpiece and the welding operation is on an inner diameter of the workpiece or an outer diameter of the workpiece;
    a power source that creates an arc between the electrode and the workpiece;
    a depth component that detects a height from the electrode to the workpiece;
    a welding torch position component that actuates the welding torch at a first track speed relative to the track and at a first workpiece speed relative to a welding zone on the workpiece;
    a wire guide that guides a welding wire toward the welding zone on the workpiece;
    a wire guide position component that adjusts a position of the wire guide relative to the workpiece; and
    a controller component that calculates, from a change in the height due to a diameter change of the layer of material deposited onto the workpiece, a second track speed relative to the track and different from the first track speed and that maintains the welding torch at the first workpiece speed relative to the welding zone, and wherein the welding torch position component further actuates the welding torch at the second track speed, wherein the controller controls the wire guide position component to adjust a position of the wire guide based on the change in the height from the electrode to the workpiece.

2. The welder system of claim 1, the welding torch performs the welding operation with two or more deposits of material onto the workpiece.

3. The welder system of claim 1, further comprising an input component that receives a selection to display the second track speed or the first track speed.

4. The welder system of claim 1, further comprising a display component that renders a portion of a graphic related to the first track speed and the second track speed.

5. The welder system of claim 1, further comprising the controller further configured to adjust a welding parameter of the welding operation based on the change in the height.

6. The welder system of claim 2, wherein each of the two or more deposits of material correspond to a respective revolution around the workpiece.

7. The welder system of claim 4, wherein the portion of the graphic includes at least one of a text, a number, a letter, a symbol, or a displayed pixel.

8. The welder system of claim 5, wherein the welding parameter is at least one of an arc voltage, a wire feed speed, a welding torch height relative to the workpiece, an arc current level, an oscillation rate of the electrode, an oscillation width of the electrode, a temperature of welding wire, a temperature of the electrode, a polarity of a current of the arc, a polarity of a current of welding wire, a physical location of the workpiece, or a physical location of the welding torch.

9. The welder system of claim 6, wherein the two or more deposits of material are a welding sequence for the workpiece.

10. The welder system of claim 5, further comprising:
    the second track speed is less than the first track speed for the welding operation that is an outer diameter welding operation; and
    the second track speed is greater than the first speed for the welding operation that is an inner diameter welding operation.

11. The welder system of claim 9, wherein the welding sequence includes at least one of the following:
    at least one root weld;
    at least one fill weld; or
    at least one cap weld.

12. A welder system, comprising:
    an orbital welder having a chassis supported adjacent to a workpiece;
    a welding torch coupled to the chassis that includes an electrode;
    a power source that creates an arc between the electrode and the workpiece;
    a wire feeder that is connected to a supply of welding wire to provide a welding wire to a puddle formed by the electrode;
    means for receiving a user input that selects an inner diameter welding operation or an outer diameter welding operation as a selected welding operation;
    means for moving the welding torch on a track coupled to the chassis at a first track speed relative to the track and at an electrode speed relative to a welding zone on the workpiece;
    means for detecting a change of a height of the electrode from the workpiece during the selected welding operation, wherein the change of the height is due to a diameter change of a layer of material deposited onto the workpiece during welding;
    means for guiding a welding wire toward the welding zone on the workpiece;
    means for calculating, from the change in the height due to the diameter change of the layer of material deposited onto the workpiece, a second track speed relative to the track and different from the first track speed and that maintains the welding torch at the electrode speed relative to the welding zone, wherein the calculating is further based on the user input;

means for adjusting a position of the means for guiding the welding wire relative to the workpiece based on the change of the height from the electrode to the workpiece; and
means for displaying at least one of the first track speed, the second track speed, and the electrode speed during the selected welding operation.

* * * * *